(12) United States Patent
Schneider et al.

(10) Patent No.: US 7,468,028 B2
(45) Date of Patent: *Dec. 23, 2008

(54) IMPLANTABLE HEARING AID TRANSDUCER

(75) Inventors: Robert Edwin Schneider, Erie, CO (US); Scott Allan Miller, III, Lafayette, CO (US)

(73) Assignee: Otologics, LLC, Boulder, CO (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/624,800

(22) Filed: Jan. 19, 2007

(65) Prior Publication Data

US 2007/0129595 A1 Jun. 7, 2007

Related U.S. Application Data

(63) Continuation of application No. 10/821,719, filed on Apr. 9, 2004, now Pat. No. 7,166,069.

(51) Int. Cl.
*H04R 25/00* (2006.01)

(52) U.S. Cl. .................................................. 600/25
(58) Field of Classification Search ................ 600/25; 607/56–59; 381/322, 328, 329
See application file for complete search history.

(56) References Cited

U.S. PATENT DOCUMENTS

| 3,984,711 A | 10/1976 | Kordik |
| 4,628,907 A | 12/1986 | Epley |
| 5,024,224 A | 6/1991 | Engebretson |
| 5,456,654 A | 10/1995 | Ball |
| 5,800,336 A | 9/1998 | Ball et al. |

*Primary Examiner*—Samuel G Gilbert
(74) *Attorney, Agent, or Firm*—Marsh Fischmann & Breyfogle LLP

(57) ABSTRACT

A variable reluctance motor is provided having a linear relationship between an input current and an output force. According to one aspect of the invention, the motor comprises a stator, an armature, and at least one magnetic member to provide a biasing force on the armature. According to this characterization, the motor also includes a drive coil to generate an electromagnetic field in response to a current input. The electromagnetic field, in turn, moves the armature relative to the stator during motor operation.

6 Claims, 8 Drawing Sheets

IMPLANTABLE HEARING AID TRANSDUCER

CROSS-REFERENCE TO RELATED APPLICATIONS

This application claims priority as a continuation application to U.S. patent application Ser. No. 10/821,719 filed on Apr. 9, 2004, now U.S. Pat. No. 7,166,069, entitled "VARIABLE RELUCTANCE MOTOR." The foregoing patent application is incorporated herein by reference in its entirety.

FIELD OF THE INVENTION

The present invention relates to motors, and in particular, to a variable reluctance motor having a substantially linear relationship between input current and a resulting force.

BACKGROUND OF THE INVENTION

Electromagnetic motors are utilized in a variety of applications, both as motors to deliver force and as sensors to detect force acting on the motor. Electromagnetic motors employ one or more coils and one or more magnets that comprise an armature (moving portion of the motor) and a stator (stationary portion of the motor) to generate an output force. One type of electromagnetic motor, sometimes referred to in the art as a Lorentz motor, operates on the principle that force is created by the interaction of magnetic fields. In this case, a current is provided to a conductor, such as a coil, located in a magnetic field provided by a magnet, to generate a force that is proportional to the input current. In other words, a linear relationship exists between the current provided to the conductor and the output force generated by the motor. So long as the conductor remains in the area of the magnetic field, a linear current to force relationship exists. Unfortunately, however, in this design, flux from the magnetic field passing through the conductor increases the reluctance, e.g. the magnetomotive force across a structure divided by the flux through the area of the structure, of the magnetic path thereby increasing the size of the magnet required for a given output force.

Another type of electromagnetic motor, known as a variable reluctance motor, operates on the principle that an iron core placed in a magnetic field always aligns in the minimum reluctance position e.g. where the magnetic field meets the lowest resistance. In a variable reluctance motor, both the armature and the stator have iron cores with salient poles. Due to the salient poles in the armature and stator, displacement of the armature relative to the stator produces a variation of the reluctance of the magnetic circuit.

Operationally, the windings of the variable reluctance motor are excited by a complex time varying source, such that when a phase winding is energized, the armature positions itself to achieve a minimum reluctance for that phase. Just as the armature approaches equilibrium, current is switched to the next phase winding to maintain motion. Variable reluctance motors, while being capable of producing large forces in a compact form factor, produce these forces in a non-linear manner, as the reluctance is non-linear. In this regard, the force produced by a variable reluctance motor is substantially proportional to the product of the square of the winding ampere-turns and the rate of change of the inductance as a function of armature position.

In many applications, however, it is desirable that a motor produce a high force output in a compact form factor, respond linearly to current input, and be independent of the position of the armature relative to the stator. For instance, in the class of hearing aids generally referred to as implantable hearing aids, some or all of various hearing augmentation componentry is positioned subcutaneously on or within a patient's skull, typically at locations proximate the mastoid process. Implantable hearing aids may be generally divided into two sub-classes, namely semi-implantable and fully implantable. In a semi-implantable hearing aid, components such as a microphone, signal processor, and transmitter may be externally located to receive, process, and inductively transmit an audio signal to implanted components such as a transducer. In a fully-implantable hearing aid, all of the components, e.g. the microphone, signal processor, and transducer, are located subcutaneously. In either arrangement, an implantable transducer is utilized to stimulate a component of the patient's auditory system.

One type of implantable transducer is an electromechanical transducer having a driver to move a vibratory actuator. As will be appreciated, it is desirable that the driver output force be linearly related to the input current as controlled movements of the actuator are utilized to stimulate one or more bones of the ossicular chain to cause or enhance the sensation of hearing for the patient. It is also, desirable that the size of implantable transducers be minimized due to their environment of use.

SUMMARY OF THE INVENTION

In view of the foregoing, a primary object of the present invention is to improve the operational characteristics of variable reluctance motors. Another object of the present invention is to improve the efficacy of variable reluctance motors, e.g. force generated for a given input current or motor size. Another object of the present invention is to provide a variable reluctance motor having an output force that is linearly related to an input current.

According to one aspect of the present invention, a variable reluctance motor is provided. The variable reluctance motor according to this aspect linearly responds to an input current, e.g. exhibits a substantially linear relationship between input current and generated force. According to this aspect, the motor comprises a stator, an armature, and at least one magnetic member to provide a biasing force on the armature. According to this characterization, the motor also includes a drive coil to generate an electromagnetic field in response to a current input. The electromagnetic field, in turn, moves the armature portion relative to the stator portion during motor operation.

In one feature of the present aspect, the motor may be designed, e.g. the components configured, so that the armature portion moves linearly relative to the stator portion of the motor.

In another feature of the present aspect, the motor may be designed, e.g. the components configured, so that the armature portion rotates relative to the stator portion of the motor.

In either case, in another feature of the present aspect, the magnetic member may be a permanent magnet that is provided to generate a biasing force in the form of a permanent magnetic field that acts in a substantially balanced manner on the armature of the motor. In this regard, the permanent magnet may be configured and/or located in the motor (or the motor itself may be configured according to the magnet design) such that equal and opposite magnetic fields emitted from the magnetic poles of the permanent magnet act in a substantially balanced manner on the armature.

In another feature of the present aspect, the magnetic member may be an electromagnetic member, e.g. such as a second coil that is provided to generate the biasing force in the form of electromagnetic fields that act in a substantially balanced manner on the armature of the motor.

In either case, e.g. whether a permanent magnet or electromagnetic member is utilized, it is desirable that biasing force generated by the magnetic member be larger than the electromagnetic field generated by the drive coil of the motor. It is also desirable, but not necessary, that the magnetic member be located in the motor so that it is substantially outside of the path traveled by the electromagnetic fields generated by the drive coil of the motor. The present inventors have recognized that this in turn results in a greater motor efficacy through reduced reluctance, e.g. output force for a given input current.

To provide the substantially balanced biasing force on the armature, the magnetic member may be disposed in relation to the armature so that absent a current being applied to the drive coil of the motor, the magnetic member generates magnetic fields or flux between its poles that act on the armature in a substantially equal and opposite manner relative to an axis of armature movement, e.g. substantially balanced manner. In this regard, absent current to the drive coil of the motor, the armature remains in a state of static equilibrium as equal, e.g. in force, and opposite, e.g. in direction, magnetic fields act on the armature. During motor operation, however, e.g. when current is applied to the drive coil of the motor, the electromagnetic field generated by the drive coil operates on the magnitude of the biasing force provided by the magnetic member. In particular, the electromagnetic field from the drive coil offsets the substantially balanced magnetic field of the magnetic member to cause the armature to move as a function of the direction of the applied current. According to this characterization, the input current may be an alternating current to switch the direction of the electromagnetic field generated by the drive coil and thereby switch the direction of armature movement. Operationally, according to this characterization, an input current applied in a first direction on the drive coil generates an electromagnetic field in a first direction that operates to increase a first portion of the biasing force from the magnetic member and decrease a second portion of the biasing force from the magnetic member. This in turn operates to move the armature in a first direction, e.g. toward the decreased portion of the biasing force and away from the increased portion of the biasing force. Similarly, in response to switching the direction of the input current the electromagnetic field generated by the drive coil increases the second portion of the biasing force and decreases the first portion of the biasing force to move the armature in the opposite direction, e.g. toward the decreased portion of the biasing force and away from the increased portion of the biasing force.

Advantageously, the biasing force from the magnetic member operates to cancel non-linearities in the motor to provide a linear relationship between the input current to the drive coil and an output force of the motor. Also, advantageously, the biasing force applied by the magnetic member does not affect the acoustic performance of the motor. Still yet another advantage provided where the magnetic member is located outside of the path traveled by the electromagnetic field generated by the drive coil, is that reluctance in the motor is reduced thereby increasing the motor efficacy, e.g. output force for a given input current.

In another feature of the present aspect, the motor may include a single drive coil to generate the electromagnetic field or alternatively, may include multiple drive coils that are electrically connected to generate the electromagnetic field.

In another feature of the present aspect, the motor is configured to define a path of travel for the electromagnetic field emitted from the drive coil, which is substantially continuously magnetically conductive. For instance, the motor may include a back iron portion designed to minimize air gaps in the path traveled by the electromagnetic field from the drive coil to reduce reluctance and increase motor efficacy e.g. output force for a given input current.

According to another aspect of the present invention, an implantable hearing aid transducer is provided. According to this aspect, the transducer comprises a transducer body, an actuator, and a driver. The actuator is movable relative to the body to stimulate an auditory component when the same is interfaced therewith. The driver includes a variable reluctance motor to move the actuator in response to an input current, wherein an output force provided by the variable reluctance motor is substantially linearly related to the input current.

In one feature of the present aspect, the driver may be a variable reluctance motor according to the first aspect of the present invention including one or more of the above set forth features. According to this characterization, the actuator may be interconnected to the armature of the motor such that axial movements of the armature are communicated to the actuator. Accordingly, the actuator is axially moved relative to the transducer body to stimulate an auditory component of a patient when the same is interfaced therewith. In one example according to this aspect, the actuator may be interconnected to the armature of the motor. In another example according to this aspect, the actuator may be the armature of the motor. That is, the actuator may be an integral non-separable part that functions as an actuator for the transducer and an armature of the driver.

In another feature of the present aspect, the armature and the stator of the present motor may each include a biocompatible enclosure. According to this characterization, the driver may be separately sealed within the transducer body such that sealing is not required at the movable connection between the actuator and the transducer body. That is, the independent driver enclosure(s) eliminates the necessity of providing an interconnection between the actuator and the transducer body that is both sealed and movable.

According to another aspect of the present invention a method of operating an electric motor is provided. The method includes the steps of generating an electromagnetic field in a stator portion of the motor in response to an input current. The method further includes the step of moving an armature portion of the motor relative to the stator portion in response to the generated electromagnetic field. According to this characterization, a reluctance of the motor varies during the moving step as a function of the armature position relative to the stator portion. The method further includes producing an output force in the motor that is substantially linearly related to the input current.

In one feature of the present aspect, the method may further include inducing a biasing force on the armature of the motor. According to this characterization, the method may further include, providing an alternating input current to generate an alternating electromagnetic field. According to this characterization, when the electromagnetic field travels in a first direction a first portion of the biasing force is increased while a second portion is decreased to move the armature in a first direction. Similarly, when the electromagnetic field travels in a second direction the first portion of the biasing force is decreased while the second portion is increased to move the armature in a second direction. Additional aspects, advantages and applications of the present invention will be apparent to those skilled in the art upon consideration of the following description and drawings.

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to enable others skilled in the art to utilize the invention in such, or other embodiments, and with various modifications required by the particular application(s) or use (s) of the present invention.

Figure 1:
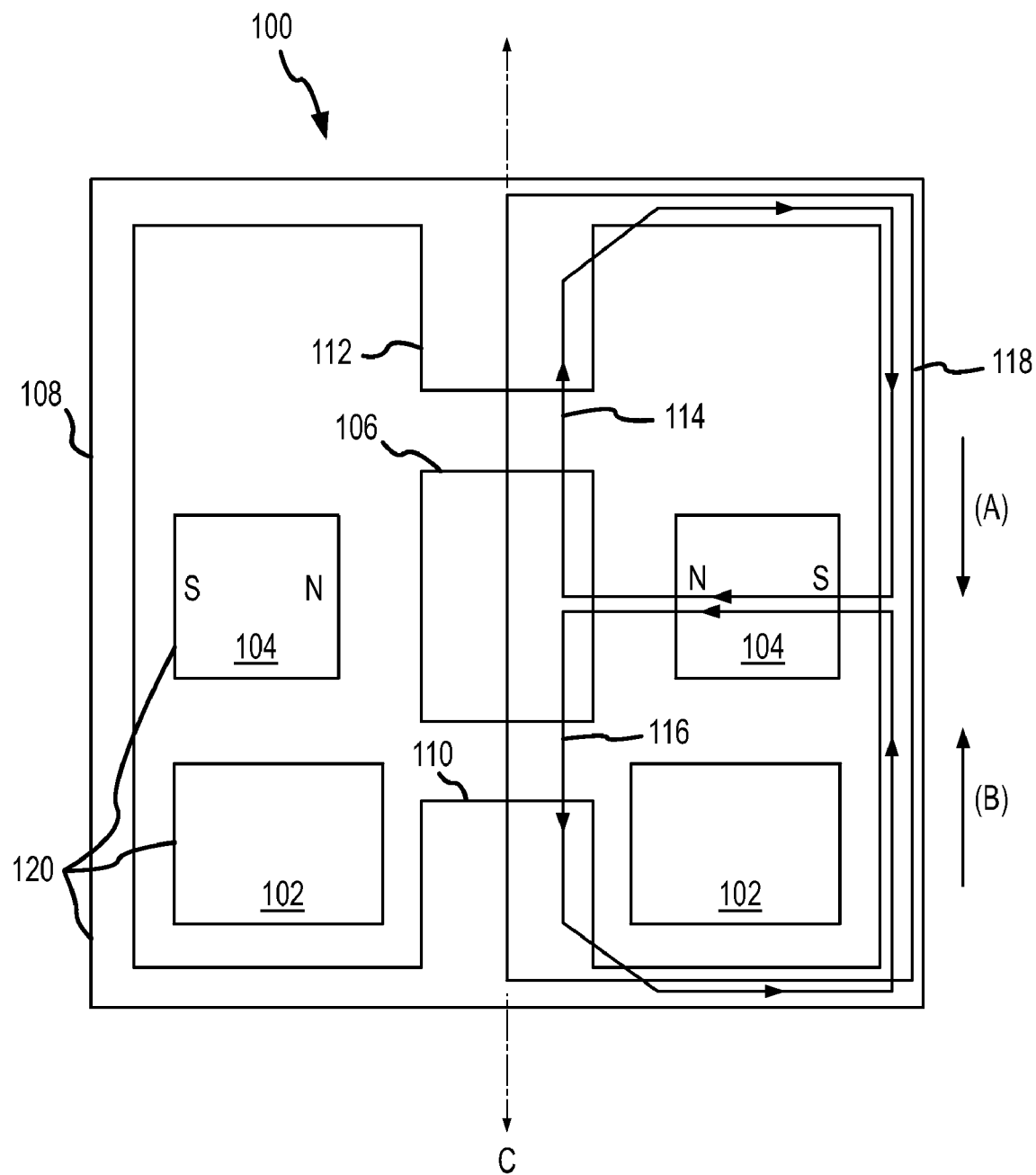
FIG. 1 illustrates an example of a variable reluctance motor according to the present invention.

FIG. 1 illustrates one example of a variable reluctance motor according to the present invention, namely motor 100. The motor 100 includes an armature 106 and a stator 120; including at least one drive coil 102, at least one magnetic member 104, and a back iron 108. The back iron 108 includes a first pole 110 and a second pole 112 that define a linear axis of movement for the armature 106 along the axis C of the motor 100. In this regard, the motor 100 operates on the principle of variable reluctance, in which a piece of highly permeable material, e.g. the armature 106, is pulled along the axis C with increased or decreased force as a function of the amount of current applied to the coil 102. In other words, the armature 106 is disposed for linear movement back and forth along the center axis C toward and away from the poles 110 and 112 as a function of the current applied to the coil 102. The motor 100, however, is configured to maximize the linearity of an output force over a maximum displacement range of the armature 106, while linearizing variability in the inductance, or electromotive force induced for a given current input to the coil 102. In this regard, the motor 100 is configured to operate on a push pull principle to achieve a substantially balanced design. In other words, during movement of the armature 106 relative to the stator 120, nonlinear terms of reluctance cancel in the center of the range of motion and substantially cancel in other positions. This in turn, not only linearizes the inductance components of the motor 100 but also permits the motor 100 to provide a linear force output in response to input current and be substantially independent of the position of the armature 106.

According to one embodiment, the magnetic member 104 may be a permanent magnet disposed relative to the armature 106 so that it provides a biasing force on the armature 106. The biasing force may be a constant biasing force. In the present context, constant biasing force refers to a substantially constant force acting on the armature 106, at least during motor operation, e.g. when a current is applied to the drive coil 102. In this regard, the magnetic member 104 may also be disposed about the armature 106. In particular, the magnetic member 104 may be annular in shape such that it circumscribes the armature 106. More particularly, the magnet member 104 may centrally circumscribe the armature 106 such that it is both configured and located to provide the biasing force on the armature 106. In this regard, the magnetic member 104 may be radially polarized, with the interior being the north (N) pole and the exterior being the south (S) pole. That is, the circumferentially facing sides of the magnetic member 104 define the magnetic poles such that magnetic flux passes from one circumferentially facing side of the magnetic member 104 around the inner and outer ends of the magnetic member 104 into the opposite circumferentially facing side along the paths indicated generally as 114 and 116. Thus, absent a current being applied to the coil 102, the magnetic member 104 generates permanent magnetic fields or flux between its poles that are equal and opposite, as indicated by the paths 114 and 116 on FIG. 1. The central location of the magnet member 104 relative to the armature 106 locates the magnetic fields indicated by 114 and 116 such that they act on the armature 106 in a substantially balanced manner, e.g. in equal and opposite directions. This in turn results in the magnet member 104 providing a substantially balanced magnetic force on the armature 106 that coincides with the direction of movement of the armature 106 along the axis C, absent current being applied to the coil 102. Those skilled in the art will appreciate, however, other configurations and locations of the magnet member 104 that provide the substantially balanced force on the armature 106 as a function of other configurations of the motor 100.

Alternatively, it will be appreciated that the magnetic member 104 may be a plurality of magnets circumscribing the armature 106 so long as each pole of each magnet is disposed adjacent to and in facing relationship with a pole piece of the same or like polarity to achieve the substantially balanced magnetic field acting on the armature 106. In still yet another alternative example, the magnetic member 104 may be two separate but opposing magnets located on opposing first and second sides of the armature 106 so long as each pole of each magnet is disposed adjacent to and in facing relationship with a pole piece of the same or like polarity.

In another embodiment, the magnetic member 104 may be a coil biased with direct current (DC) such that the coil provides equal and opposite electromagnetic fields acting on the armature 106 in a substantially balanced manner.

The coil 102 may be wound around the pole 110, as illustrated on FIG. 1, or alternatively may be wound around the pole 112. As will be appreciated, the number of windings on the coil 102 is determinative of the strength of the electromagnetic field generated by the coil 102 when it is energized. Advantageously, however, as will become apparent from the following description, the motor 100 is configured to minimize reluctance in the electromagnetic circuit path 118, to maximize a given force output from the motor 100 for a given number of windings on the coil 102. In this regard, the coil 102 may be wound around the pole 110 such that an alternating current may be applied to the coil 102 to produce an electromagnetic field normal to the direction of winding along the path 118. According to this characterization, the direction of flux flow is a function of the direction of an input current applied to the coil 102. In other words, while the path 118 of the electromagnetic field remains the same, the direction of travel of the magnetic flux may be switched as a function of the direction of the current applied to the coil 102. Of importance in this regard, is that reluctance is minimized (e.g. minimum resistance to magnetic flux) in the overall path 118, as the coil 102 produced flux does not pass through the magnetic member 104, but rather, passes through the armature 106 and the back iron 108. Advantageously, the efficacy of the motor 100 is improved by increasing the strength of the electromagnetic field generated for a given number of windings of the coil 102 as the reluctance in the path 118 is minimized, e.g. air gaps and other structure having a high magnetic field resistance are minimized and magnetically conductive material in the path 118 maximized. Accordingly, the armature 106 may be any high permeability magnetically conductive material. In one example, the armature 106 may be an alloy material having a high saturation flux, such as a Fe/Co/V alloy in the ratios 49/49/2, known in the art as Permendur 2V.

Operationally, the motor 100 may be viewed as a pair of back-to-back variable reluctance motors that share a portion of a magnetic circuit. According to this characterization, as current is applied to the coil 102 in a first direction, as for instance in the counterclockwise direction, electromagnetic flux is generated along the path 118 in direction (A). This in turn affects the strength of the permanent magnetic fields along the paths 114 and 116. In particular, an electromagnetic field traveling in the direction (A) along the path 118 in the opposite direction of the permanent magnetic field in path 116, and in the same direction as the permanent magnetic field in the path 114, operates to increase the permanent magnetic field along the path 114 and decrease the permanent magnetic field along the path 116. This in turn causes the armature 106 to move between the poles 112 and 110 in the direction (A) toward the pole 110 Similarly, when the current in the coil 102 is switched, e.g. is induced in the opposite direction, the electromagnetic field is generated along the path 118 in direction (B). This in turn, operates to reduce the strength of the permanent magnetic field along the path 114, which is traveling in the opposite direction, and increases the permanent magnetic field along the path 116, which is traveling in the same direction, causing the armature 106 to travel between the poles 112 and 110 toward the pole 112. In this manner, switched application of the current to the coil 102 offsets the substantially balanced permanent magnetic fields along paths 114 and 116 that exist about the armature 106 absent current to the coil 102. This, in turn, causes armature 106 to move back and forth between the poles 110 ands 112 as a function of the direction of the current and resulting flow of the electromagnetic field along path 118. Of importance, is that the biasing force provided by the magnetic member 104 operates to cancel out non-linear forces that are typically exhibited by a variable reluctance motor. In this regard, the operational principles will now be explained in mathematical terms using a single variable reluctance motor to explain the advantages of the present motor 100. Thus, for a two pole variable reluctance motor as represented, for instance, by paths 114 and 118, the output force generated may be given by, Equation 1:

$$F = -\frac{1}{2}\left(\frac{NI}{\mathfrak{R}}\right)^2 \frac{d\mathfrak{R}}{dx}$$

Where
N=represents the number of turns on the coil;
I=represents the current (so that NI is the total current threading the coil core);
$\mathfrak{R}$=represents the reluctance (resistance to magnetic flux), and
x=represents the displacement of the coil in the direction of motion.

While this type of motor is capable of producing large forces in a compact form factor, the resulting force is proportional to the square of the current, rather than linear with current. In other words, the force is non-linear due to the $NI^2$ term, which leads to distortion. Furthermore, the reluctance $\mathfrak{R}$ is a function of separation as given by, Equation 2:

$$\mathfrak{R} = \frac{L_S}{\mu_0 A_S}$$

Where:
$L_s$=represents the effective length of the structure,
$A_s$=represents the effective area of the structure.

This leads to changes in amplitude and non-linearity as the armature vibrates back and forth. It also leads to changes in the output force with armature position, which causes a significant change in inductance with position.

In the case of motor 100, however, including the biasing force induced by permanent magnetic member 104, the output force of half of motor 100 may be given by, Equation 3:

$$F = -\frac{1}{2}\left(\frac{NI + NI_{BIAS}}{\mathfrak{R}}\right)^2 \frac{d\mathfrak{R}}{dx}$$
$$= -\frac{1}{2\mathfrak{R}^2}(NI^2 + NI \times NI_{BIAS} + NI_{BIAS}^2)\frac{d\mathfrak{R}}{dx}$$

As illustrated by Equation 3, where $NI_{BIAS}$ is much larger than NI, $NI^2$ will be small compared to $NI \times NI_{BIAS}$, resulting in a linear output force for a given input current to the coil 102. Advantageously, where the biasing force applied by the permanent magnetic 104 is constant, the $NI_{BIAS}^2$ term is a constant biasing force on the motor 100, and thus, does not alter the acoustic performance of the motor 100. In this regard, the biasing force applied by the magnetic member 104 replaces the $NI_{BIAS}$ term in equation 3 above, as given by Equation 4:

$$NI_{PM} = \frac{B_r L_m}{\mu_m}$$

Where:
$B_r$=represents the remnant magnetic field of the permanent magnet;
$L_m$=represents the effective length (i.e., from N to S pole) of the magnet; and
$\mu_m$=represents the permeability of the magnet, typically within a few percent of $$\mu_0 = 4\pi \times 10^{-7} \frac{\text{Henry}}{m},$$

which is the permeability of free space.

Thus is explained the performance of a variable reluctance motor 100. In this regard, each half of the motor 100, comprising in the first case paths 114 and 118, and in the second case paths 116 and 118, form back-to-back variable reluctance motors, each generating a force, e.g. $F_1$ and $F_2$, according to Equations 3 and 4, but with signs altered to account for the orientations of current and magnetic flux. In this regard, the total resultant force on the armature 106 is the sum of these two forces $F_1$ and $F_2$. As a result, the non-linear term due to the square of the current in the two halves substantially cancel. The constant terms due to the force produced by the permanent magnet 104 alone on the armature 106 also substantially cancel. That is, the armature 106 is substantially balanced. The remaining force contains only one term, which is linear in current.

Figure 2:
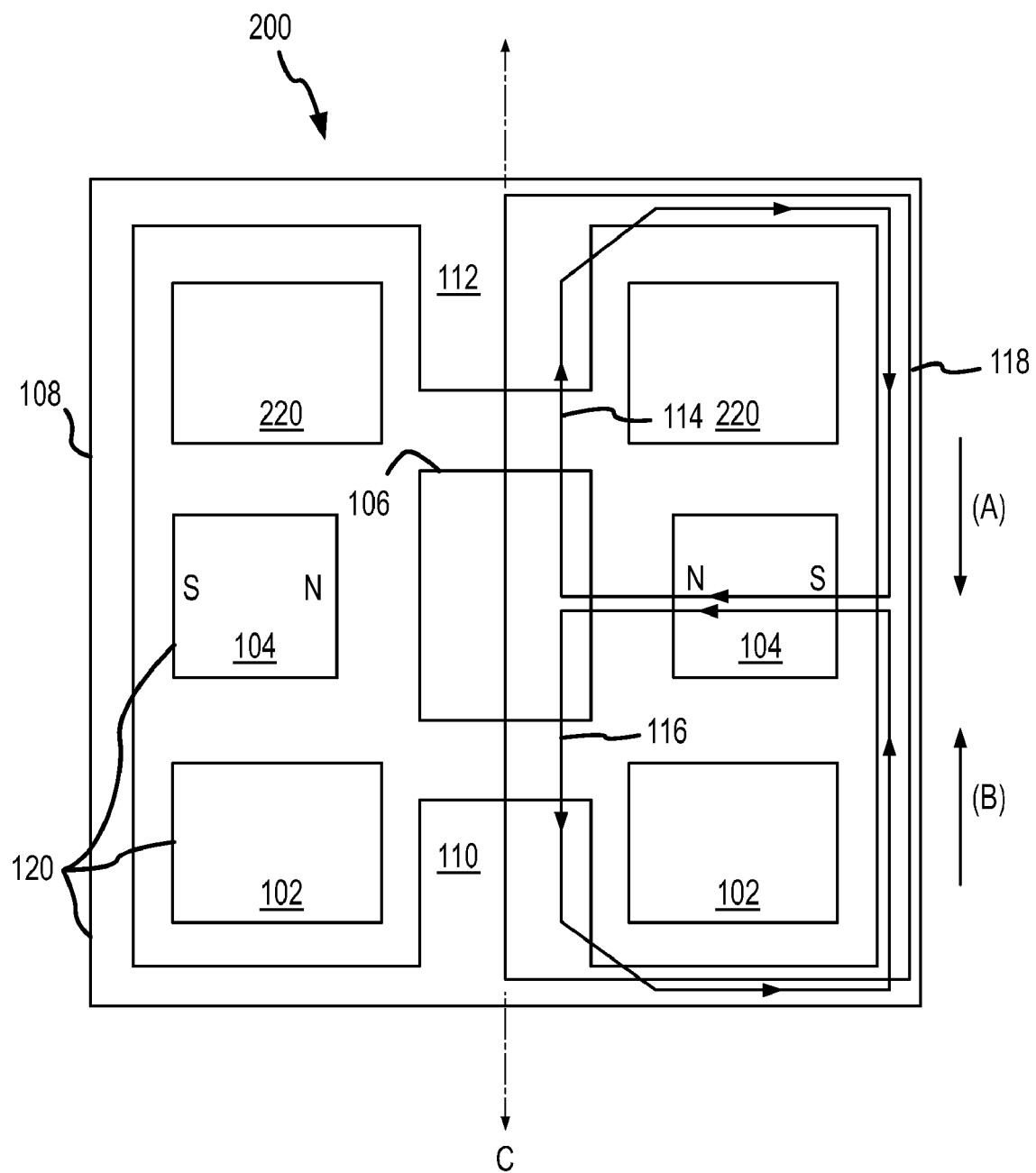
FIG. 2 illustrates another example of a variable reluctance motor according to the present invention.

Referring to FIG. 2 there is shown an alternative embodiment of the motor 100, namely the motor 200. The motor 200 is substantially similar to the motor 100 except that rather than a single coil 102, the motor 200 includes a second coil 220 wound around pole 112 in the same direction as thee coil 102. According to this characterization, the coil 220 is electrically connected to coil 102 such that current flows in the same direction in both coils 102 and 220 to generate the electromagnetic field along path 118. Operationally, the motor 200 is identical to motor 100. Of note, however, it will be appreciated that the additional windings provided by the coil 220 may increase the maximum output force the motor 200 is capable of generating as output force is directly related to the number of windings of the coils 102 and 220.

Figure 3:
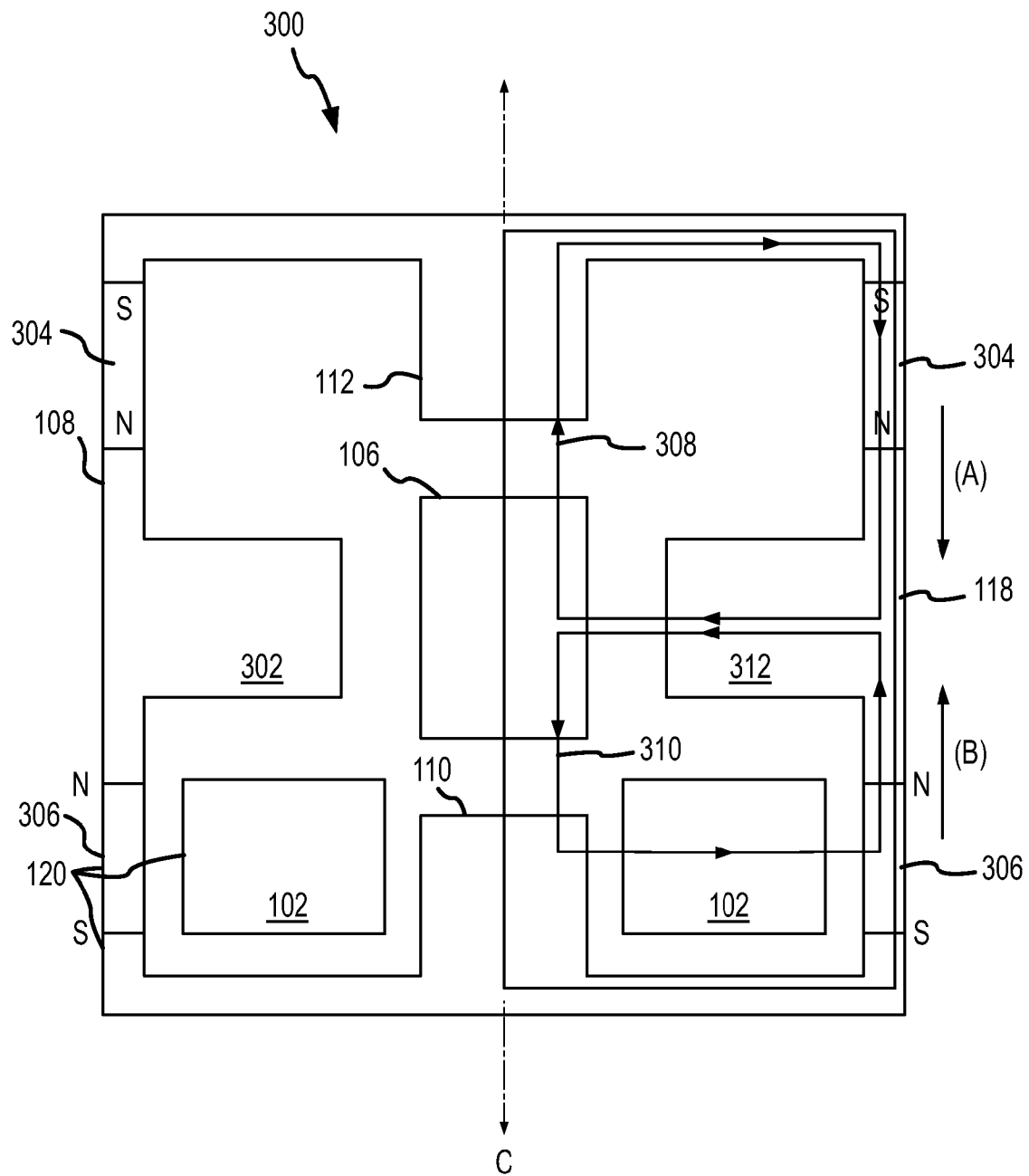
FIG. 3 illustrates another example of a variable reluctance motor according to the present invention.

Referring to FIG. 3 there is shown still yet another alternative embodiment of the motor 100, namely the motor 300. The motor 300 includes the armature 106, the coil 102, the back iron 108, and the poles 110 and 112 respectively. In contrast, however, the motor 300 includes magnetic members 304 and 306 disposed within the wall of the back iron 108. According to this characterization, the magnetic members 304 and 306 generate a biasing force, which acts along the paths 308 and 310 respectively on the armature 106 of the motor 300. As with the motor 100, while other means for producing the biasing force may be utilized, the magnetic members 304 and 306 may be permanent magnets that produce permanent magnetic fields along the paths 308 and 310 that are larger than the electromagnetic field generated by the coil 102 along the path 118. According to this characterization, the motor 300 also includes poles 302 and 312 respectively, which may be made of the same magnetically conductive material and form a part of the back iron 108. The poles 302 and 312 operate to reduce the reluctance in the paths 308 and 310 by minimizing the amount of air that the permanent magnetic fields from magnetic members 304 and 306 pass through.

As with motor 200, it will be appreciated that in the alternative the motor 300 may be constructed using a pair of coils, e.g. 102 and 220. Operationally, the motor 300 is identical to the motors 100 and 200. It should be noted, however, that the motor 300 may be slightly less efficient as the electromagnetic flux path 118 passes through the magnetic members 304 and 306 thereby slightly increasing the reluctance in the path 118.

Figure 4:
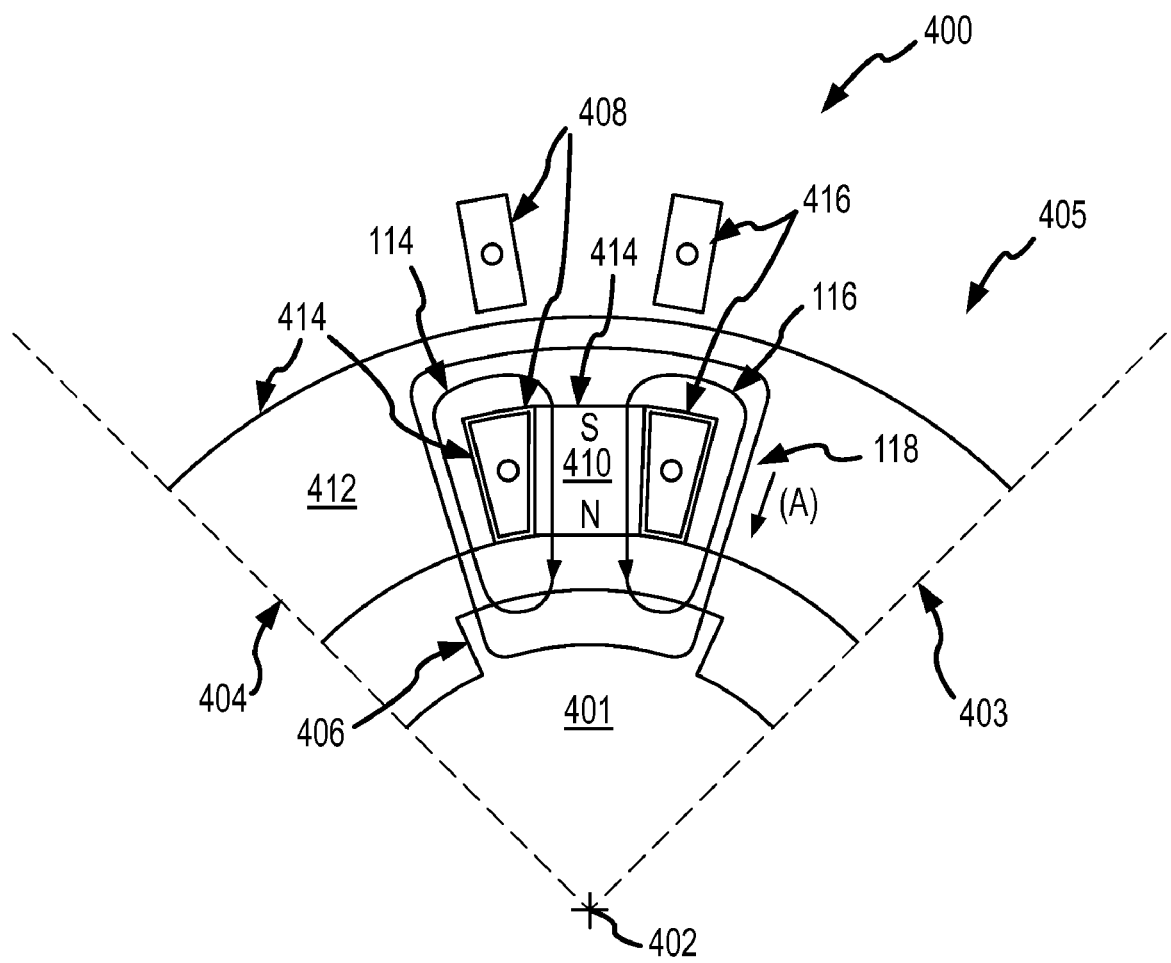
FIG. 4 illustrates another example of a variable reluctance motor according to the present invention.

Referring to FIG. 4 there is shown still yet another alternative embodiment of the motor 100, namely the motor 400. For purpose of illustration, FIG. 4 depicts a sector 405 of the motor 400, delineated by lines of symmetry 403 and 404. The motor 400 includes an armature 406 and a stator 414, including at least one drive coil 408, at least one magnetic member 410, and a back iron 412. In this regard, the motor 400 is similar to the motor 200 except that rather than a linear armature 106, the motor 400 includes a rotary hub 401, rotating about a central pivot 402, carrying the curved armature 406. In this regard, those skilled in the art will appreciate that while a single sector 405 may be used to provide rotation through a limited range about pivot 402, the motor 400 would typically be comprised of multiple sectors, such as sector 405, to provide continuous 360 degree rotation of the armature 406 about pivot 402. It should be noted that the curved armature 406 may be repeated about the rotary hub 401 so as to cover a larger portion of a 360 degree circle. In other words, multiple armatures, e.g. 406, may be disposed about the circumference of the rotary hub 401. It will be appreciated that this may provide more force or a larger range of continuous rotary motion about pivot 402. In the case of multiple armatures, e.g. 406, the multiple armatures may be disposed about the rotary hub 401 in an offset fashion. This assures that one or more of the armatures is located in a substantially balanced manner in relation to each different stator sector. Thus, only the drive coil 408 adjacent to the preferred armature, (which provides the most linear output) need be activated, using commutation techniques familiar to those skilled in the art. Furthermore, it should be noted that an additional coil 416, which operates identically to coil 220 of motor 200, may be incorporated into the motor 400 as a matter of choice. In this regard, the windings of the drive coil 408 (and similarly the coil 416 if utilized) may be wound circumferentially such that a portion of the windings are located outside of the back iron 412, as illustrated on FIG. 4.

Operationally, the sector 405 is identical to motor 100 except that forces are developed on the curved armature 406 rather than on the linear armature 106. In other words, as current is applied to the drive coil 408 in a first direction, as for instance in the counterclockwise direction, electromagnetic flux is generated along the path 118 in direction (A). This in turn affects the strength of the magnetic fields generated by the permanent magnet member 410 along the paths 114 and 116. In particular, an electromagnetic field traveling in the direction (A) along the path 118 in the opposite direction of the magnetic field in path 116, and in the same direction as the magnetic field in the path 114, operates to increase the magnetic field along the path 114 and decrease the magnetic field along the path 116. This in turn causes the armature 406 to move toward the decreased field to the next sector. It will be appreciated that the next sector (not illustrated) would have a magnetic member and drive coil with an appropriate polarity to provide rotary force in the same direction as sector 405. In this manner the drive coils, e.g. 408, of the motor 400 may be energized, with current having a phase difference between them, one or more at a time, to cause rotation of the armature 406.

Hearing Aid System:

As noted above, in many applications it is desirable that a motor design be compact, respond linearly to current input, and be independent of the position of the armature relative to the stator. For instance, one example where such characteristics are desirable is in implantable hearing aid technology, and in particular, in implantable transducer technology. Hearing aid implantable transducers often utilize a small motor to induce movement of an actuator. The actuator is interfaced with an auditory component such that the induced movement causes one or more bones of the ossicular chain to mechanically vibrate and cause or enhance the sensation of sound for a patient. As will be appreciated a compact design, linear response to current input, and independent positioning of the armature driving the actuator are desirable motor characteristics in such transducers, given the small size and delicate nature of human auditory system.

Figure 5:
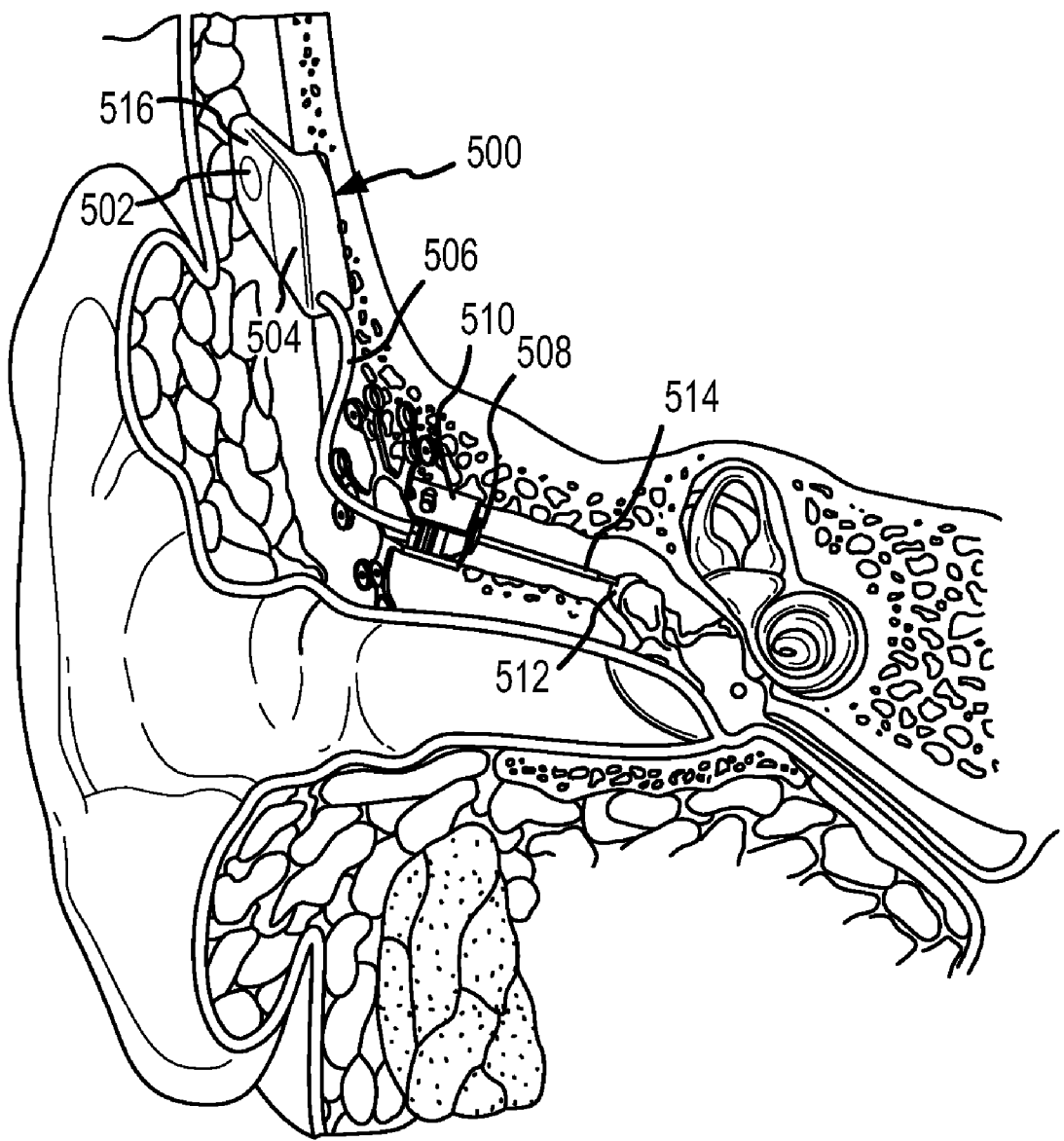
FIGS. 5 and 6 illustrate implantable and external componentry respectively, of a semi-implantable hearing aid device application of the present invention.
Figure 6A:
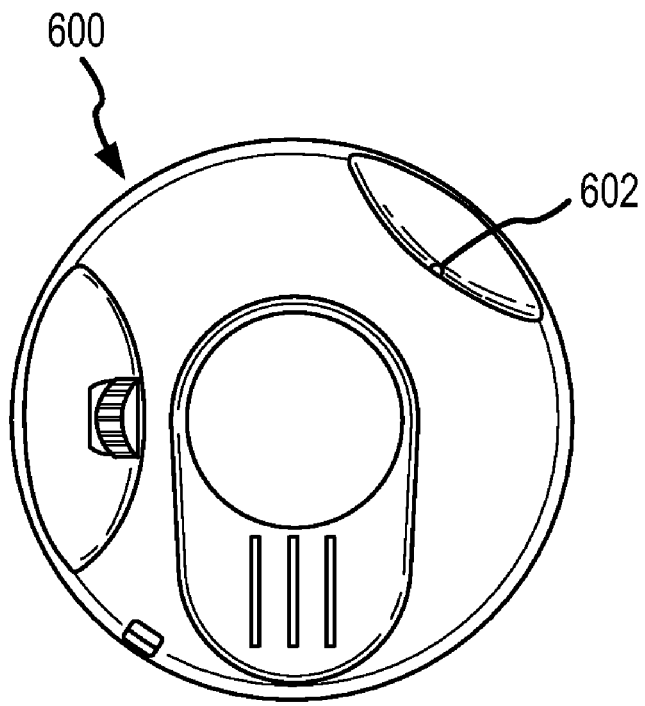
Figure 6B:
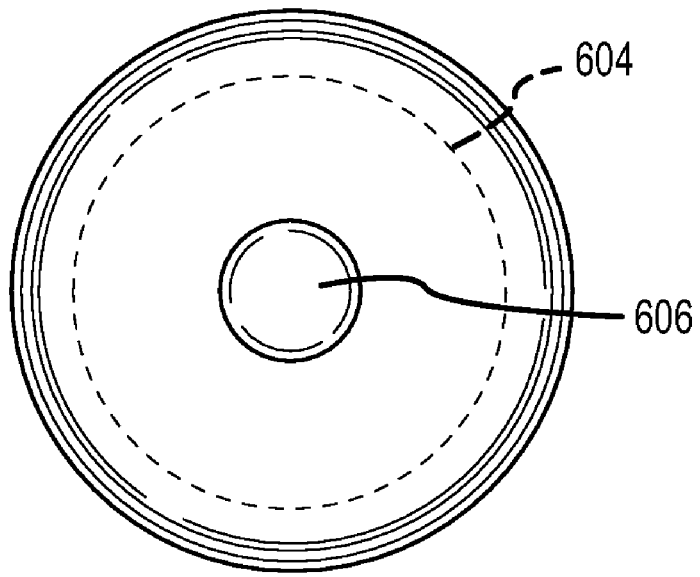

FIGS. 5 and 6 illustrate an example of a semi-implantable hearing aid system having implanted components shown on FIG. 5, and external components shown on FIG. 6. As will be appreciated, the present invention may also be employed in conjunction with fully implantable systems, wherein all components of the hearing aid system are located subcutaneously.

In the illustrated system, an implanted biocompatible housing 500 is located subcutaneously on a patient's skull. The housing 500 includes an RF signal receiver 516 (e.g. comprising a coil element) and a signal processor 504 (e.g. comprising processing circuitry and/or a microprocessor). The signal processor 504 is electrically interconnected via wire 506 to a transducer 508. As will become apparent from the following description, various processing logic and/or circuitry may also be included in the housing 500 as a matter of design choice.

The transducer 508 is supportably connected to a mounting apparatus 510 mounted within the patient's mastoid process (e.g. via a hole drilled through the skull). The mounting apparatus 510 may be any one of a variety of anchoring systems that permit secure attachment of the transducer 508 in a desired position relative to a desired auditory component, e.g. the ossicular chain 512. As will be described in further detail below, the transducer 508 includes a vibratory actuator 514 for transmitting axial vibrations to a member of the ossicular chain 512 of the patient (e.g. the incus).

Referring to FIG. 6, the semi-implantable system further includes an external housing 600 comprising a microphone 602 and internally mounted speech signal processing (SSP) unit (not shown). The SSP unit is electrically interconnected to an RF signal transmitter 604 (e.g. comprising a coil element). The external housing 600 is configured for disposition around the rearward aspect of the patient's ear. The external transmitter 604 and implanted receiver 502 each include magnets, 606 and 502, respectively, to facilitate retentive juxtaposed positioning.

During normal operation, acoustic signals are received at the microphone 602 and processed by the SSP unit within external housing 600. As will be appreciated, the SSP unit may utilize digital processing to provide frequency shaping, amplification, compression, and other signal conditioning, including conditioning based on patient-specific fitting parameters. In turn, the SSP unit provides RF signals to the transmitter 604. Such RF signals may comprise carrier and processed acoustic drive signal portions. The RF signals are transcutaneously transmitted by the external transmitter 604 to the implanted receiver 502. As noted, the external transmitter 604 and implanted receiver 118 may each comprise coils for inductive coupling of signals therebetween. Upon receipt of the RF signals, the implanted signal processor 504 processes the signals (e.g. via envelope detection circuitry) to provide a processed drive signal via wire 506 to the transducer 508. The drive signals cause the actuator 514 to vibrate at acoustic frequencies to effect the desired sound sensation via mechanical stimulation of the ossicular chain 512 of the patient.

Figure 7:
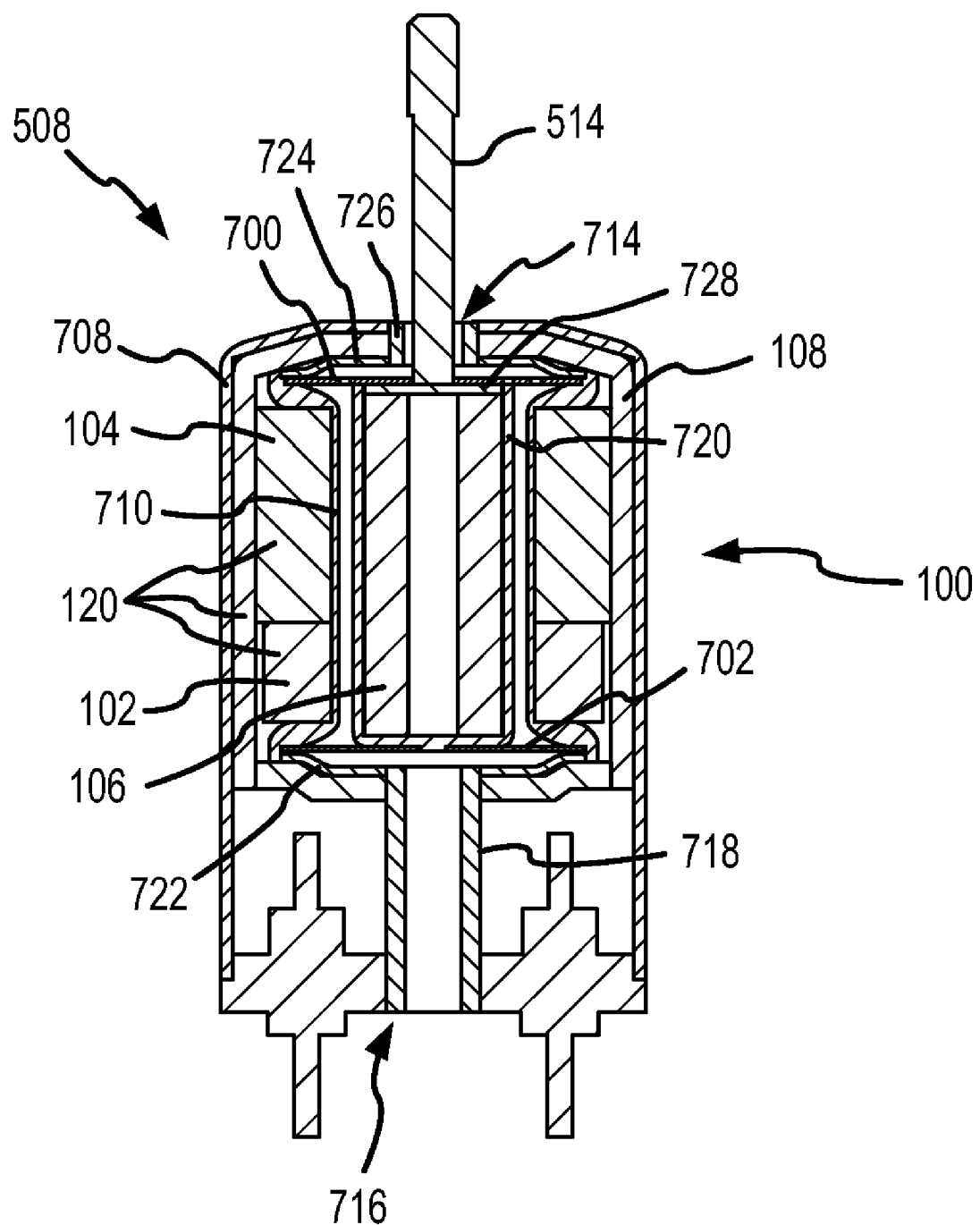
FIG. 7 illustrates one example of an implantable transducer including a variable reluctance motor according to the present invention.

Hearing Aid Transducer:

Referring to FIG. 7 there is shown the transducer 508 incorporating an example of a motor according to the present principles. It should be expressly understood that while the transducer 508 in this example is illustrated with the motor 100, any one of the above described motors or variations according to the principles disclosed herein may be utilized in the transducer 508, and thus the following description is provided for purpose of illustration and not limitation.

The motor 100 operates as a transducer driver to induce axial movements of the actuator 514. The actuator 514 may be constructed from any material of sufficient rigidity for transmission of vibrations to the ossicles. Some examples of the actuator 514 include a wire, tube, pin etc. formed from a biocompatible material, e.g. titanium. Additionally, the actuator 514 may function as both an actuator and an armature, or alternatively, may be a separate structure connectable to the armature 106.

The transducer 508 includes components, such as the motor 100 and transducer electronics, which may be damaged by exposure to biological fluids, and therefore, it is desirable to limit exposure of such components to the same. At the same time, however, providing an interconnection between a movable member, such as the actuator 514, and the transducer 508 that is both movable and sealed is difficult as such an interconnection necessitates forming a seal between the actuator 514 and the transducer housing that does not interfere with driving or moving of the actuator 514 in response to transducer drive signals. Advantageously, the armature 106 and the stator 120 of the motor 100 are separate components, each of which includes an independent biocompatible enclosure. This in turn permits separation of the means for providing the movable connection between the actuator 514 and the transducer 508, and the means for sealing sensitive internal components of the transducer 508, such as the motor 100.

According to one example, the armature 106 is located in a biocompatible enclosure, comprising a cylindrical housing 720 made of a biocompatible material, such as titanium. The housing 720 includes an integrally formed bottom and a separately connectable lid 728 to facilitate assembly, e.g. insertion of the armature 106 followed by hermetic welding of the lid 728 to the housing 720 to form a sealed biocompatible enclosure. According to this example, the actuator 514 is interconnected and extends perpendicularly from the lid portion 728 through an opening formed in an end 714 of the transducer housing 708. As will be appreciated, the actuator 514 may be an integral part of the lid portion 728 or may be interconnected to the lid portion 728 by a means such as a weld. It will be appreciated that according to the present principles, the biocompatible housing 720 for the armature 106 may be formed by other means as well, such as for example, electroplating of the armature 106 with a biocompatible material, such as gold.

A biocompatible enclosure 710 is also provided between the enclosure 720 and the coil 102 and magnetic member 104. As will be further appreciated from the following description, the enclosure 710 in conjunction with the back iron 108 seals the coil 102 and the magnetic member 104 from exposure to bodily fluids. According to this characterization, the enclosure 710 conforms to the shape of the coil 102 and magnetic member 104 such that each end includes a flanged portion. The enclosure 710 further includes a mating flange 724 at the end 714 and a mating flange 722 at the end 716 of the transducer 508. The flange 724 is connected to a tube 726, which extends interior from the end 714 of the transducer 508 where it is sealably connected to the flange 724, such as by a hermetic weld. Similarly, the flange 722 is connected to a tube 718, which extends interior from the end 716 of the transducer 508 where it is sealably connected to the flange 722, such as by a hermetic weld. The flange 724 also connects to the flanged portion of the enclosure 710, such as by a hermitic weld. Similarly, the flange 722 connects to the flanged distal end of the enclosure 710, such as by a hermitic weld. As will be appreciated, the biocompatible enclosure 710 made up of the tubes 726 and 718, the flanges 724 and 722, and the hourglass shaped can may be made of numerous biocompatible materials, with at least one example including titanium.

Figure 8:
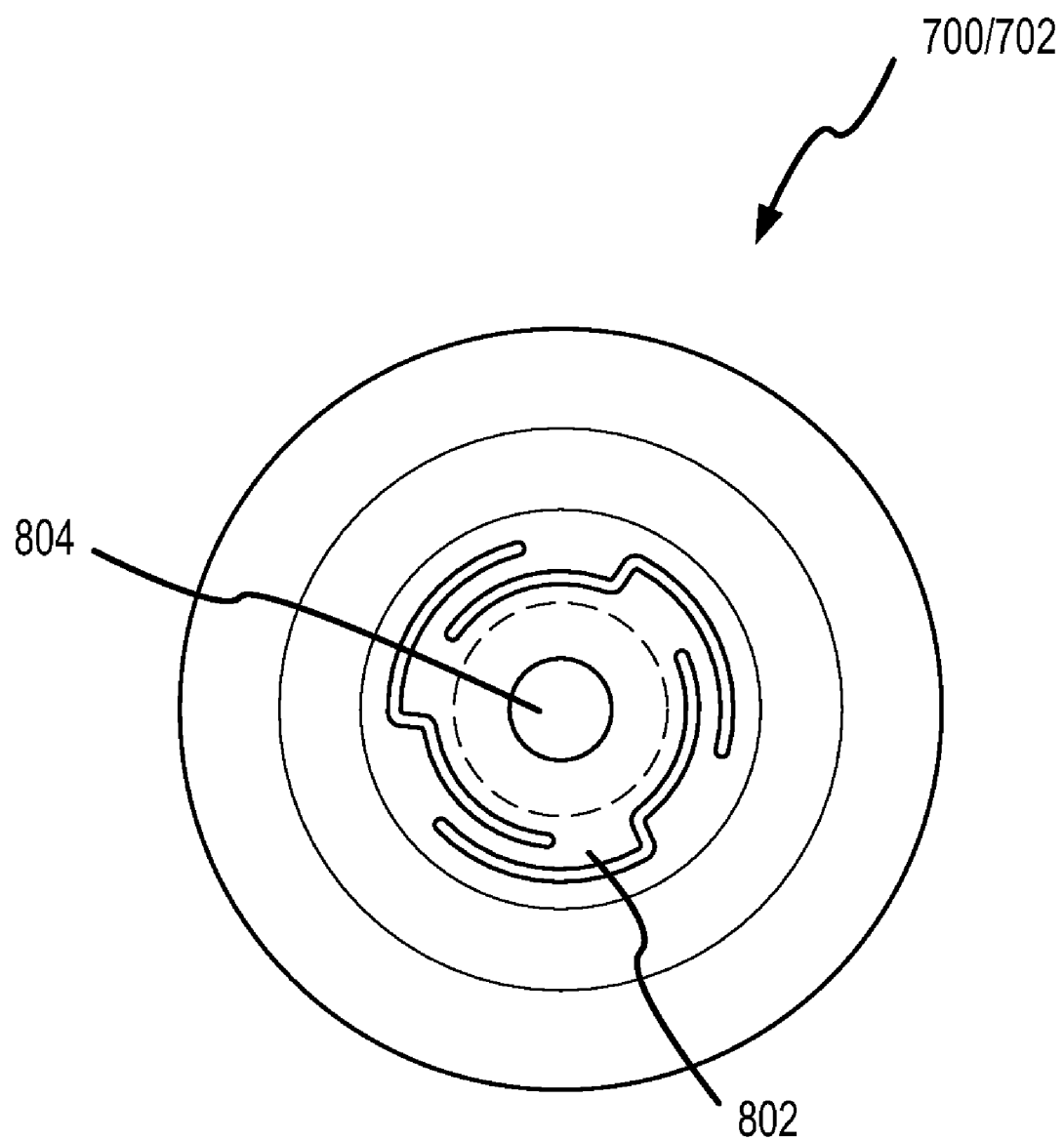
FIG. 8 illustrates an example of a means resilient member for the transducer of FIG. 7.

As noted above, the transducer 508 operates to stimulate an auditory component, such as the ossicles, through axial vibrations transmitted by the actuator 514. One example of a means for providing a movable connection between the actuator 514 the transducer 508 is spring washers 700 and 702, as exemplified by spring washer 700 illustrated in FIG. 8. In this regard, spring washers 700 and 702 also keep the armature 106 substantially centered and in a balanced position when coil 102 is not energized.

The spring washer 700 is connected about an interior portion to the top of the biocompatible housing 720. Similarly, the spring washer 700 is sandwiched about its periphery between the flange 724 and the flanged portion of the enclosure 710. The spring washer 700 includes a central aperture 804 provided to accommodate the actuator 514. To permit the axial movement of the tube actuator 514 and armature 106, the spring washer 700 includes a plurality of helical cutouts that define a plurality of helical leafs 802 between the connected periphery and interior portions of the spring washer 700. In this regard, the spring washer 702 is connected in a similar manner to the bottom of the housing 720 and between the flange 722 and the flanged portion of the enclosure 710. The spring washer 702 does not have an aperture 804 to accommodate the actuator 514, but does have a plurality of helical cutouts to define a plurality of helical leafs, e.g. leafs 802.

The helical leafs 802 in the spring washers 700 and 702 allow the interior portions of the spring washers 700 and 702 to flex inward and outward, relative to their rigidly fixed peripheries. In particular, the helical leafs 802 flex relative to the fixed peripheries with the advancing and retracting of the armature 106 and actuator 514. Of importance, is that while the spring washers 700 and 702 permit axial movements of the armature 106 and actuator 514 relative to the transducer 508, they restrict lateral or side-to-side movements. As will be appreciated by those skilled in the art, minimizing such lateral movement of the armature 106 and actuator 514 is highly desirable in a system designed to axially stimulate an auditory component, such as the incus.

It should be noted in this regard, that according to this design, fluid is permitted to flow through the interior portion of the transducer housing 708. In particular, the helical leafs 802 permit fluid to enter the interior space defined by the housing 720 and enclosure 710 through the tubes 726 and 718 at each end of the transducer 508. Advantageously, however, as noted above, the sealing of transducer components is separated from the means for providing the movable connection between the armature 106 and actuator 514.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of operating an electric motor of an implantable hearing aid transducer, the method comprising:
   generating an electromagnetic field in a stator portion of the electric motor of the implantable hearing aid transducer in response to an input current;
   moving an armature portion of the motor relative to the stator portion in response to the generated electromagnetic field, wherein a reluctance of the motor varies during the moving step as a function of the armature position relative to the stator portion;
   producing a force that is substantially linearly related to the input current.

2. The method of claim 1 the method comprising:
   inducing a biasing force on the armature portion of the motor at least while the input current is provided.

3. The method of claim 2 wherein the inducing step comprises:
   inducing a substantially balanced magnetic force acting on the armature of the motor.

4. The method of claim 3 wherein the moving step comprises:
   providing an input current in a first direction to generate the electromagnetic field in the first direction;
   increasing a first portion of the biasing force with the electromagnetic field generated in the first direction;
   decreasing a second portion of the biasing force with the electromagnetic field generated in the first direction to move the armature in the first direction;
   providing the input current in a second direction to generate the electromagnetic field in the second direction;
   increasing the second portion of the biasing force with the electromagnetic field generated in the second direction; and
   decreasing the first portion of the biasing force with the electromagnetic field generated in the second direction to move the armature in the second direction.

5. A method of operating an implantable hearing aid transducer, the method comprising:
   supplying an input current to a variable reluctance motor of an implantable hearing aid transducer;
   driving the variable reluctance motor in response to said supplying;
   producing, in response to said driving, a force on an actuator of the variable reluctance motor that is substantially linearly related to the input current;
   moving, in response to said producing, the actuator relative to a transducer body of the variable reluctance motor, wherein the actuator is interfaced with an auditory component; and
   stimulating the auditory component by the moving of the actuator.

6. The method of claim 5 further comprising:
   generating an electromagnetic field in response to the input current;
   moving an armature of the motor relative to a stator of the motor in response to said generating; and
   generating a biasing force with at least one magnetic member, wherein the at least one magnetic member is located relative to the armature to cause the biasing force to act on the armature in a substantially balanced manner, wherein one of said armature and said stator is interconnected to said actuator.

* * * * *